(12) United States Patent
Bruce

(10) Patent No.: US 7,163,369 B2
(45) Date of Patent: Jan. 16, 2007

(54) VARIABLE STATOR VANE BUSHINGS AND WASHERS

(75) Inventor: Robert W. Bruce, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/325,011

(22) Filed: Jan. 4, 2006

(65) Prior Publication Data

US 2006/0110246 A1 May 25, 2006

Related U.S. Application Data

(63) Continuation-in-part of application No. 11/207,921, filed on Aug. 19, 2005, which is a continuation-in-part of application No. 10/445,428, filed on May 27, 2003, now Pat. No. 7,094,022.

(51) Int. Cl.
F01D 17/16 (2006.01)

(52) U.S. Cl. ..................... 415/160; 415/200

(58) Field of Classification Search ............... 415/160, 415/200; 416/241 R
See application file for complete search history.

(56) References Cited

U.S. PATENT DOCUMENTS

| | | | |
|---|---|---|---|
| 3,711,171 A | 1/1973 | Orkin et al. | |
| 3,873,168 A | 3/1975 | Viola et al. | |
| 4,163,364 A | 8/1979 | Shirato et al. | |
| 4,492,522 A | * | 1/1985 | Rossmann et al. .......... 415/200 |
| 5,536,022 A | 7/1996 | Sileo et al. | |
| 5,622,473 A | 4/1997 | Payling | |
| 5,807,072 A | 9/1998 | Payling | |
| 6,086,327 A | 7/2000 | Mack et al. | |
| 6,139,261 A | 10/2000 | Bishop et al. | |
| 6,146,093 A | 11/2000 | Lammas et al. | |
| 6,170,990 B1 | 1/2001 | Hawkins | |
| 6,184,333 B1 | 2/2001 | Gray | |
| 6,264,369 B1 | 7/2001 | Mesing et al. | |
| 6,474,941 B1 | 11/2002 | Dingwell et al. | |
| 6,481,960 B1 | 11/2002 | Bowen | |
| 2001/0016091 A1 | 8/2001 | Mesing et al. | |
| 2001/0022934 A1 | 9/2001 | Mashey | |
| 2002/0071760 A1 | 6/2002 | Dingwell et al. | |
| 2002/0154991 A1 | 10/2002 | Bowen | |

* cited by examiner

Primary Examiner—Richard A. Edgar
(74) Attorney, Agent, or Firm—McNees Wallace & Nurick LLC

(57) ABSTRACT

A variable stator vane assembly for use in a compressor section of a turbine engine having a plurality of movable metallic stator vanes and a method for making a variable stator vane assembly. The variable stator vane assembly includes a metallic stator casing supporting the vanes and a bushing system positioned between the stator vanes and the stator casings. The bushing system includes a bushing fabricated from a material selected from the group consisting of metal, ceramic or combinations thereof. The variable stator vane further including a titanium nitride wear coating disposed on a surface of the vanes in contact with the bushing system.

24 Claims, 8 Drawing Sheets

VARIABLE STATOR VANE BUSHINGS AND WASHERS

CROSS-REFERENCE TO RELATED APPLICATIONS

This application is a Continuation-in-Part of U.S. patent application Ser. No. 11/207,921 filed Aug. 19, 2005, which is a Continuation-in-Part of U.S. patent application Ser. No. 10/445,428, filed May 27, 2003 now U.S. Pat. No. 7,094,022, each of which is herein incorporated by reference in their entirety.

FIELD OF THE INVENTION

This invention relates generally to components of gas turbine engines and, in particular, to variable stator vane bushings and washers systems used in the compressor section of the engine.

BACKGROUND OF THE INVENTION

In gas turbine engines, for example, aircraft engines, air is drawn into the front of the engine, compressed by a shaft-mounted rotary compressor, and mixed with fuel. The mixture is burned, and the hot exhaust gases are passed through a turbine mounted on a shaft. The flow of gas turns the turbine, which turns the shaft and drives the compressor. The hot exhaust gases flow from the back of the engine, providing thrust that propels the aircraft forward.

Gas turbine engines generally include a high pressure compressor, a combustor, and a high pressure turbine. The high pressure compressor, combustor, and high pressure turbine are sometimes collectively referred to as a core engine. Such gas turbine engines also may include a low pressure compressor for supplying compressed air, for further compression, to the high pressure compressor, and a fan for supplying air to the low pressure compressor.

The high pressure compressor typically includes a rotor surrounded by a casing. The casing is typically fabricated to be removable, such as by forming the casing into two halves that are then removably joined together. The high pressure compressor includes a plurality of stages and each stage includes a row of rotor blades and a row of stator vanes. The casing supports the stator vanes, and the rotor supports the rotor blades. The rotor blade rows are adjacent stator vane rows, wherein each stage includes a set of stator vanes that direct air flow toward a downstream set of rotor blades.

To improve the overall operation of the compressor, several compressor stator vanes are rotatively mounted to allow each vane to rotate around its longitudinal axis (which extends in a radial direction from the centerline of the engine) to adjust the angular orientation of the vane relative to the airflow through the compressor. These variable stator vane assemblies are utilized to control the amount of air flowing through the compressor to optimize performance of the compressor. Each set of variable stator vanes includes an adjacent set of downstream rotor blades. The orientation of the variable stator vane affects air flow through the compressor. A lever arm is fixedly joined to the vane stem extending outwardly from the vane bushing. The distal end of the lever arm is operatively joined to an actuation ring that controls the orientation of the vane. All of the vane lever arms in a single row may be joined to a common actuation ring for ensuring that all of the variable vanes are simultaneously positioned relative to the airflow in the compressor stage at the same angular orientation.

A known variable vane assembly includes a variable vane, and a trunnion seal which may include a bushing and/or a washer. The variable vane assembly is bolted onto a high pressure compressor stator casing and the bushing and washer surround an opening that extends through the casing. The variable vane includes a vane stem that extends through the opening in the casing and through the bushing and washer. The bushing and washer are referred to herein as a bearing assembly. The bearing assembly produces a low friction surface that prevents metal on metal contact between the vane stem and the casing. Such variable vane assemblies have possible air leakage pathways through the openings in the casing. Also, the high velocity and high temperature air causes oxidation and erosion of the bearing assembly, which may accelerate deterioration of the bearing assembly, lead to failure of the bearing assembly, and eventual failure of the variable vane assembly.

Once the bearing assembly fails, an increase in leakage through the opening occurs, which results in a performance loss for the compressor. In addition, failure of the bearing assembly may result in contact between the stator vane and the casing, which causes wear and increases overhaul costs of the engine.

During operation, a gas turbine engine experiences a variety of forces within the engine that affect the bearing structures. For example, during a stall condition, forces on the vane assembly go through a reversal of direction, locally bending the case material that supports the bearing assembly. Such localized bending may result in strain and potential breakage of bearing components, particularly the bushing. High temperature or ceramic bearing materials have an elastic modulus that is much greater than the materials within the vane assembly. The result of the bearing assembly having a much greater elastic modulus is that the bushing and washer are less able to elastically deform with the case, due to the relative stiffness of the bushing/washer material. Therefore, the bushing and washer bearing structures are more susceptible to breakage when exposed to forces, such as the forces experienced during a stall condition.

A number of structures in the gas turbine engine, including the bushing and washer structures, used with variable stator vanes are subjected to conditions of wear at temperatures ranging from low temperatures to highly elevated temperatures. In addition, the bushing and washers are subject to high altitude atmospheres. In addition to low temperatures, high altitude atmosphere includes little or no water vapor.

One known material for fabrication of bushings for variable stator vane assemblies is a specially developed composite of carbon fiber reinforcing materials in a polyimide resin matrix manufactured by E. I. Du Pont De Nemours and Company of Wilmington, Del. The bushings are commonly known as VESPEL®CP™ bushings. VESPEL® and CP™ are trademarks that are owned by E. I. Du Pont De Nemours and Company. The polyimide resin used in the VESPEL®CP™ bushings is commonly known as NR150™. The NR150™ trademark is owned by Cytec Technology Group of Wilmington, Del. Although the VESPEL®CP™ bushings have an extended life at temperatures 450–500° F. (232–260° C.), the VESPEL®CP™ bushing have an upper temperature limit of 600° F. (316° C.). Extended operation at temperatures at or above 600° F. (316° C.) limit their operational life. The polymer matrix bushings do not withstand the combinations of high temperature and vibrational loading experienced in the operation of the gas turbine engine well, leading to a relatively short part life.

Another known method for reducing wear on the variable stator vane assembly is placing a carbon-containing antifriction coating on a surface in the variable stator vane assembly. This antifriction coating is fabricated from a material that reduces the coefficient of friction between the surface of the trunnion and the surface of the casing. One carbon-containing component known for lubricant coating is graphite. However, graphite has the disadvantage that water vapor is required to maintain lubricity. Atmospheres at aircraft cruise altitudes do not have enough water vapor present for graphite to be lubricious. Graphite also has the disadvantage of poor tribological properties in applications that require reciprocating motion. An additional disadvantage of graphite is that graphite begins to oxidize rapidly at temperatures around 500° C. (932° F.) and greater. Some variable stator vane systems may experience temperatures in excess of 500° C. (932° F.). Therefore, a replacement material for graphite in antifriction coating is needed.

Attempts have also been made to coat the stator vane trunnion with a wear coatings. The wear coatings previously attempted to incorporate known lubricant compositions (e.g., graphite) with low coefficient of friction with a hard, smooth wear coating having a wear resistant coating material on the vane trunnion. However, the materials used for known wear coatings lack the ability to maintain the properties of each of the individual components (i.e., fails to maintain both low coefficient of friction and wear resistance) and reduces the fatigue strength of the coated material. In other words, the wear coatings do not provide all of the desired tribological properties (e.g., reduced wear and low coefficient of friction) and mechanical properties (e.g., fatigue strength) required for extended operation of variable stator vanes subject to conditions of high temperature, vibration and high altitude atmospheres.

Accordingly, it would be desirable to provide bearing assemblies fabricated from materials having performance characteristics that will reduce or eliminate air leakage between the stator vane stem and the compressor casing while providing an increase in the wear resistance and durability of the bushing and washer to increase part life in high temperature and vibration loading applications. In addition, it would be desirable to provide coating systems that provide the desirable tribological properties and the desirable mechanical properties in order to resist wear and provide operation in a variety of atmospheres. The present invention fulfills this need, and further provides related advantages.

SUMMARY OF THE INVENTION

Materials, heretofore unknown for use in bearing assemblies, which produce equal or better wear resistance at reduced materials cost have been identified. These alternatives fall into four general categories: (1) solid materials from which bushings and washers can be fabricated, (2) coatings bonded to metallic vanes to minimize total system wear, (3) solid lubricant coatings placed on any bushing, washer and/or vane trunnion to reduce friction, and (4) porous seal tube materials that are wear resistant, capable of high temperature service and have a reduced elastic modulus. A large number of combinations therefore exist that can provide solutions to specific mechanical designs. Each design is subjected to different temperature limitations, stresses and cyclic vibrations. Thus a materials solution for one system may not be an effective materials solution for a different mechanical system design. In addition, the solution must be cost effective for the mechanical system into which it is installed. The present invention provides a mechanically effective and cost effective replacement for carbon fiber/polymer matrix bushing systems currently used in existing engine systems and engine systems being developed. The bushing systems of the present invention replace existing bushing systems that are used between vanes made from A286 material, a stainless steel or titanium alloy 6-4 and casings made from M152 material, a steel.

The present invention includes a variable stator vane assembly for use in a compressor section of a turbine engine and having a plurality of movable metallic stator vanes and a method for making a variable stator vane assembly. The variable stator vane assembly includes a metallic stator casing supporting the vanes and a bushing system positioned between the stator vanes and the stator casings. The bushing system includes a bushing fabricated from a material selected from the group consisting of metal, ceramic or combinations thereof. The variable stator vane further including a titanium nitride wear coating disposed on a surface of the vanes in contact with the bushing system.

The present invention may utilize a ceramic bushing, such as silicon nitride ($Si_3N_4$), tungsten carbide (WC), or zirconium oxide ($ZrO_2$) or metallic alloy bushing, such as STELLITE® 6, M152, 17-4 PH, L605 or 410 stainless steel. The ceramic bushings, in particular, are strong but relatively inflexible. In order to provide additional wear resistance, the vane trunnion may be coated with a wear coating, such as tungsten carbide coating, modified tungsten carbide, or a titanium nitride. Modified tungsten carbide is a tungsten carbide with a small amount of cobalt (WC—Co) sufficient to provide increased wear resistance of the coating, typically about 6–20% by weight Co and preferably about 12% by weight Co. Alternatively, the trunnion may be coated with a plasma vapor deposited (PVD) titanium nitride or tungsten carbide. Titanium nitrides suitable for use as wear coatings include, but are not limited to, TiN, TiAlCrN, and TiAlN. Additional wear resistance may be provided by applying an antifriction coating between the tungsten carbide coated vane and the bushing.

One advantage of an embodiment of the present invention is that the bearing assembly materials, including the coating systems, having a wear coating present on the vane, significantly improve the service life of the stator vane assembly and reduce the susceptibility to air leakage through the opening in the stator casing.

Yet another advantage of the lubricant coating, according to an embodiment of the present invention, is that the wear coating and antifriction coating combination reduces wear and maintains desirable tribological properties in high altitude atmospheres having little or no water vapor.

Yet another advantage of the lubricant coating, according to an embodiment of the present invention, is that the variable stator vane assembly provides an efficiency improvement in the turbine engine while reducing overhaul costs caused by wear resulting from metal on metal contact between the stator casing surface and the stator vane surface.

Yet another advantage of the lubricant coating, according to an embodiment of the present invention, is that the materials used in the variable stator vane assembly of the present invention, including the antifriction coating, can readily withstand the higher temperatures of operation utilized in current advanced engine designs. The materials used in the antifriction coating of the present invention can be utilized at temperatures greater than about 1000° F. (538° C.), including operational temperatures of up to about 1200°

F. (649° C.), without significant deterioration due to the combined effects of temperature, vibration, and high altitude atmosphere.

Yet another advantage of the lubricant coating of an embodiment of the present invention is that the antifriction coating is capable of maintaining lubricity in applications that rub in a reciprocating motion.

Another advantage of the lubricant coating, according to an embodiment of the present invention, is that the antifriction coating is resilient and regenerates in areas where the antifriction coating is rubbed thin or cleaned off the wear surface.

Yet another advantage of an embodiment of the present invention is that the method provides an inexpensive fabrication method that provides a seal tube at near-net shape, requiring few or no subsequent processing steps prior to installation into the bearing system.

Other features and advantages of the present invention will be apparent from the following more detailed description of the preferred embodiment, taken in conjunction with the accompanying figures which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
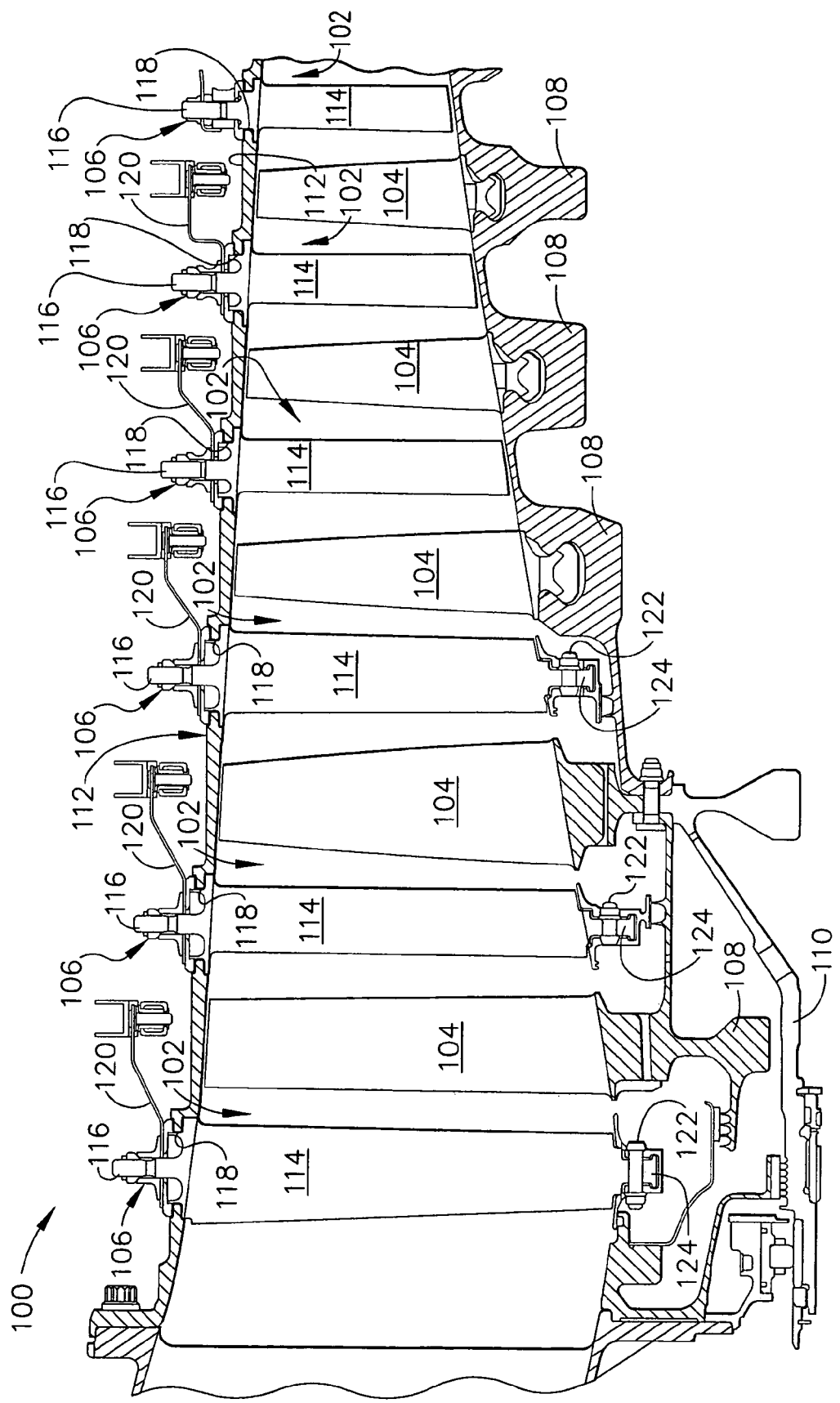
FIG. 1 is a schematic view of a portion of a prior art high pressure compressor for a turbine engine.

FIG. 1 is a schematic view of a section of a known high-pressure compressor 100 for a typical turbine engine (not shown). Compressor 100 includes a plurality of stages 102, and each stage 102 includes a row of rotor blades 104 and a row of variable stator vane assemblies 106. Rotor blades 104 are typically supported by rotor disks 108, which are connected to a rotor shaft 110. Rotor shaft 110 is a high-pressure shaft that is also connected to a high-pressure turbine (not shown). Rotor shaft 110 is surrounded by a stator casing 112 that supports variable stator vane assemblies 106.

Each variable stator vane assembly 106 includes a variable vane 114 and a vane stem 116. Vane stem 116 protrudes through an opening 118 in casing 112. Variable vane assemblies 106 further include a lever arm 120 extending from variable vane 114 that is utilized to rotate variable vanes 114. The orientation of variable vanes 114 relative to the flow path through compressor 100 control airflow therethrough. Some variable vane assemblies 106 are secured to shroud 124 by bolts 122.

Variable vane assemblies 106 control the direction of airflow through compressor 100 to maintain efficient compressor operation. However, variable vane assemblies 106 also provide a potential pathway for airflow to exit compressor 100, such as through openings 118. Airflow through openings 118 reduces the efficiency of compressor 100.

Figure 2:
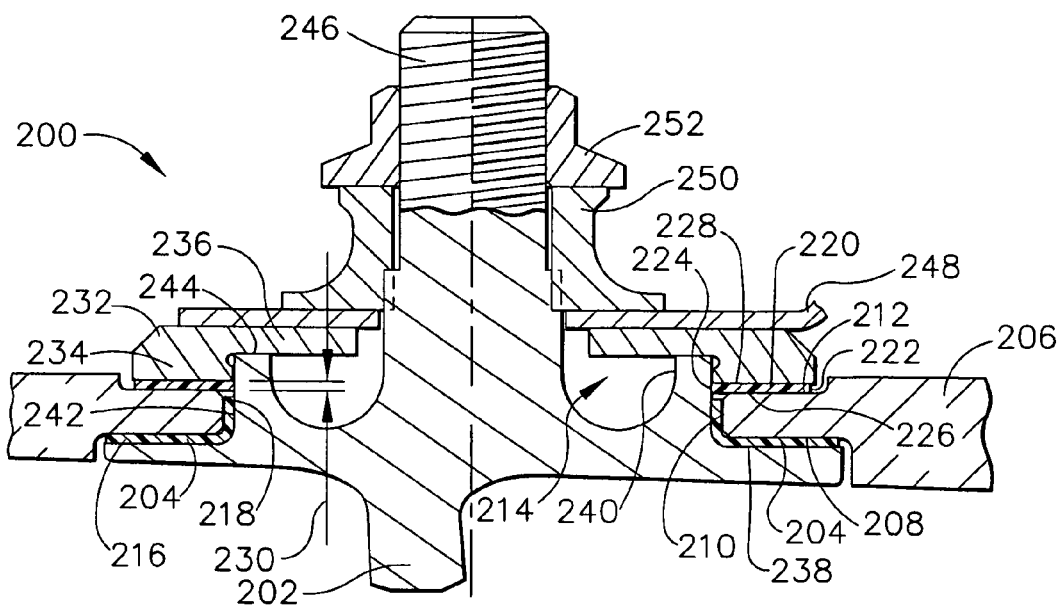
FIG. 2 is a cross-sectional view of a prior art variable vane assembly used in an aircraft turbine engine high pressure compressor.

FIG. 2 is a cross-sectional view of a known variable vane assembly 200. Variable vane assembly 200 includes a variable vane 202 extending into the airstream. A bushing 204 is positioned on variable vane 202. A casing 206 supports variable vane 202 and includes a first recessed portion 208, an inner portion 210, and a second recessed portion 212. An opening 214 is formed by inner portion 210.

Bushing 204 includes a first portion 216 and a second portion 218. Bushing first portion 216 is in direct contact with casing first recessed portion 208 and separates variable vane 202 from casing 206. Bushing second portion 218 contacts casing inner portion 210 and separates variable vane 202 from casing 206. Bushing first portion 216 extends substantially an entire length of casing first recessed portion 208. In addition, bushing second portion 218 extends substantially an entire length of casing inner portion 210 and is substantially perpendicular to bushing first portion 216. Bushing 204 prevents variable vane 202 from directly contacting casing 206.

Variable vane assembly 200 further includes a washer 220. Washer 220 is substantially flat and includes an outer diameter surface 222 and an inner diameter surface 224. More specifically, washer 220 includes a first wall 226, a second wall 228, and a thickness 230 that is substantially constant from outer diameter surface 222 to inner diameter surface 224. Washer 220 is in direct contact with casing second recessed portion 212 and extends substantially an entire length of casing second recessed portion 212.

Variable vane assembly 200 includes a spacer 232 in contact with washer 220. Washer 220 prevents contact between spacer 232 and casing second recessed portion 212. Spacer 232 includes a spacer first portion 234 and a spacer second portion 236. Spacer first portion 234 contacts washer 220 and has a length substantially equal to a radial length of washer 220. Spacer 232 is separated from bushing 204 by washer 220. Bushing 204 and washer 220 do not contact each other. Washer 220 prevents spacer 232 from contacting casing 206.

Variable vane 202 also includes a vane first portion 238, a ledge 240 having a ledge outer portion 242, and a spacer-seating portion 244. Ledge 240 surrounds a vane stem 246. Vane stem 246 (corresponding to FIG. 1, 116) and ledge 240 extend through opening 214 (corresponding to FIG. 1, 118) in casing 206 (corresponding to FIG. 1, 112). Bushing second portion 218 extends along casing inner portion 210 of casing 206. Bushing second portion 218 prevents ledge outer portion 242 from contacting casing inner portion 210.

Variable vane assembly 200 also includes a lever arm 248 positioned around vane stem 246 and contacting spacer 232. Lever arm 248 is utilized to adjust the angle of variable vane 202, and thus alter the flow of air through the compressor.

In addition, variable vane assembly 200 includes a sleeve 250 contacting lever arm 248, and a lever arm nut 252 contacting sleeve 250. Lever arm nut 252 cooperates with vane stem 246 and maintains variable vane assembly 200 in contact with casing 206.

Variable vane assembly 200 is assembled by placing bushing 204 on variable vane 202 such that bushing first portion 216 and bushing second portion 218 contact variable vane 202 and are substantially perpendicular. Variable vane 202 and bushing 204 are inserted through opening 214 of casing 206.

Washer 220 is placed on casing 206 adjacent bushing 204. Spacer 232 is positioned on variable vane 202 and contacts washer 220. Lever arm 248 is positioned over vane stem 246 and contacts spacer 232. Sleeve 250 is positioned over vane stem 246 and contacts lever arm 248. Finally, lever arm nut 252 is positioned over vane stem 246 and contacts sleeve 250.

Washer 220 and bushing 204 form a bearing assembly used in variable vane assembly 200 and may be used, for example, in a high-pressure compressor. Washer 220 and bushing 204 may be utilized in other environments such as a rotor vane assembly, a low-pressure compressor variable vane assembly, a high-pressure turbine, an intermediate-pressure turbine or a low-pressure turbine.

Materials, heretofore unknown for use in bearing assemblies, which produce equal or better wear resistance at reduced materials cost have been identified. These alternatives fall into four general categories: (1) solid materials from which bushings and washers can be fabricated, (2) coatings bonded to metallic vanes to minimize total system wear, (3) solid lubricant coatings placed on any bushing and/or the vane stem or bushing fitted over the vane stem to reduce friction, and (4) porous seal tube materials that are wear resistant, capable of high temperature service and have a reduced elastic modulus.

Ideally, the solid bushing should be durable with good wear characteristics, however, the bushing should wear at a higher rate than the case and vane stem (either coated or uncoated) because the bushing is the least expensive and most easily replaced component. The ceramic bushings and washers are fabricated by a process, according to an embodiment of the present invention, that includes an injection molding process or forming a predetermined shape under pressure, then sintering at high temperature to burn away organic binder and fuse the ceramic particles. Likewise, metallic bushings may be formed by any suitable means, including but not limited to, extrusion, casting, forging or any other suitable metal forming method.

Suitable solid materials for the bushing include injection molded silicon-nitride such as $Si_3N_4$, tungsten carbide, and injection molded zirconia. Other suitable materials include, but are not limited to, metallic alloys, such as STELLITE® 6, M152, 17-4 PH, L605 or 410 stainless steel. STELLITE® is a federally registered trademark owned by Deloro Stellite Holdings Corporation of St. Louis, Mo. The composition of STELLITE® 6 is well-known in the art and is a designation for a cobalt-based alloy comprising about 28 weight percent chromium, about 4.5 weight percent tungsten, about 1.2 weight percent carbon, about 1.1 weight percent silicon, about 1.0 weight percent manganese, a maximum of about 3 weight percent nickel, a maximum of about 3 weight percent iron and the balance cobalt. The composition of M152 is well-known in the art and is a designation for a stainless steel comprising about 12 weight percent chromium, about 2.5 weight percent nickel, about 1.8 weight percent molybdenum, about 0.1 weight percent carbon, about 0.3 weight percent vanadium and balance iron. The composition of 17-4 PH is well-known in the art and is a designation for a stainless steel comprising about 16.5 weight percent chromium, about 4 weight percent nickel, about 3.5 weight percent copper, about 0.3 weight percent niobium, about 0.03 weight percent carbon and balance iron. The composition of L605 (i.e. HAYNES® alloy 25) is well-known in the art and is a designation for a cobalt-based alloy comprising about 20 weight percent chromium, about 15 weight percent tungsten, about 10 weight percent nickel, about 3 weight percent iron, about 1.5 weight percent manganese and the balance cobalt. HAYNES® alloy 25 is a federally registered trademark of Haynes International, Inc., Kokomo, Ind. The composition of 410 stainless steel is well-known in the art and is a designation for a stainless steel comprising about 12 weight percent chromium, about 1.0 weight percent manganese, 1.0 weight percent silicon, about 0.15 weight percent carbon, about 0.04 weight percent phosphorous, about 0.03 weight percent sulfur and balance iron. The present invention may utilize either a $Si_3N_4$, tungsten carbide, $ZrO_2$, STELLITE® 6, M152, 17-4 PH, L605 or 410 stainless steel for the bushing. These bushing materials provide improved wear and higher temperature capability than existing Vespel bushings.

Figure 3:
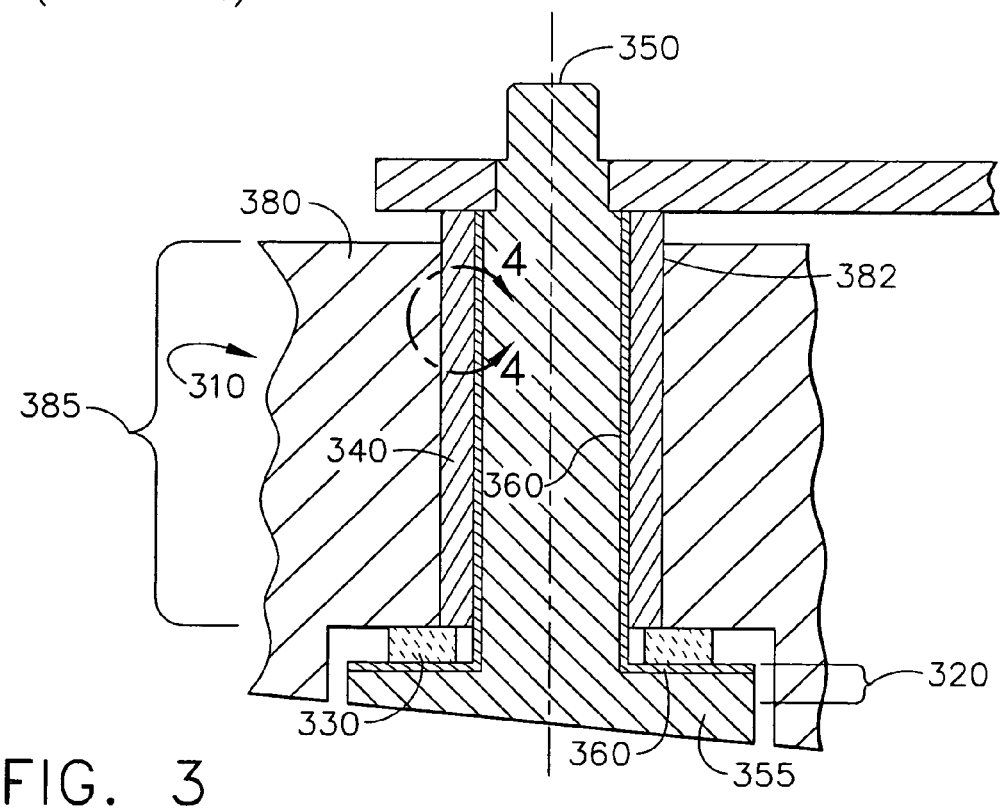
FIG. 3 is a cross-sectional view of a bushing assembly of the present invention used in a variable vane assembly of the present invention.

FIG. 3 is a cross-sectional view of variable vane bushing assembly 310 according to the present invention. Variable vane bushing assembly 310 includes casing 380 having a substantially cylindrical opening having a center axis extending through thickness 385 of casing 380. Vane trunnion 350 and bushing 340 are disposed inside the cylindrical opening. Casing 380 supports and allows rotation of trunnion 350 and bushing 340 in casing 380. Bushing 340 provides a barrier between trunnion 350 and casing 380. Trunnion 350 rotates about the variable vane bushing assembly center axis and rubs against bushing 340. Bushing 340 prevents vane trunnion 350 from directly contacting casing 380, thereby reducing wear on each of bushing 340 and vane trunnion 350.

Variable vane bushing assembly 310 may also include a washer 330 disposed between casing 380 and vane button 320. Vane button 320 is located on the surface of the stator vane 355 nominally perpendicular to the surface of trunnion 350 extending to the edges of stator vane 355. The upper face of vane button 320, like the adjacent vane trunnion 350, is coated with a wear coating 360. In a preferred embodiment, the vane trunnion 350, the vane button 320 and the entire stator vane 355, including the airfoil are coated with wear coating 360. Vane button 320 having wear coating 360 rubs against washer 330 as vane 355 rotates. Washer 330 is preferably the same material as bushing 340 to promote low wear of trunnion 350 and vane button 320. Washer 330 contacts casing 380 and bushing 340, and rubs against vane button 320. The washer may be fabricated from the same material as the cylindrical bushing 340 or may be fabricated from a different material.

Washer 330 and bushing 340 form a bearing assembly that facilitates the motion of variable stator vane 355. The relative motion of trunnion 350 with respect to casing 380 results in frictional contact between trunnion 350, vane button 320, bushing 340 and washer 330. The wear on trunnion 350 and vane button 320 is reduced by wear coating 360. Wear coating 360 is disposed on trunnion 350 and wear button 320.

Figure 4:
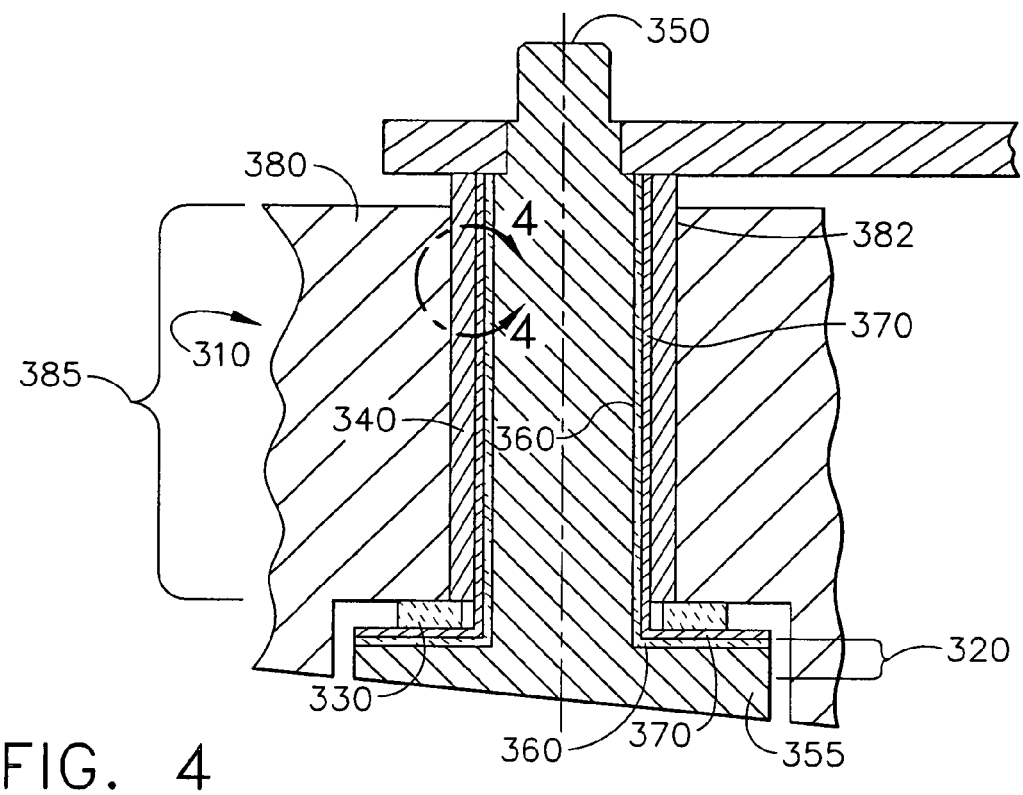
FIG. 4 is a cross-sectional view of a bushing assembly according to an alternate embodiment of the present invention used in a variable vane assembly of the present invention.

FIG. 4 shows the same configuration of variable vane bushing assembly 310 as shown and described with respect to FIG. 3. However, FIG. 4 includes an antifriction coating 370 disposed between the wear coating 360 and the bushing 340 and washer 330, preferably on one or more of the surface of the wear coating 360 and the surface of bushing 340. Antifriction coating 370 is disposed on wear coated vane button 320 and forms a barrier between washer 330 and wear coated vane button 320. Antifriction coating 370 may be disposed on wear coating 360, on bushing 340 on washer 330 or on a combination thereof.

In addition to bushing 340, a wear coating 360 and an antifriction coating 370 are also disposed between vane trunnion 350 and casing 380. Wear coating 360 is disposed on surface 410 (shown in FIGS. 5–8) of vane trunnion 350 and on the upper face of vane button 320. Surface 430 (shown in FIGS. 5–8) of the wear coating 360 and surface 440 (shown in FIGS. 5–8) of bushing 340 form opposed surfaces that are adjacent to each other and are in frictional contact. Antifriction coating 370 forms a lubricant coating on the opposed surfaces and is disposed on the inside of bushing 340, on the wear coated vane trunnion 350, on wear coated vane button 320 or a combination thereof.

Figure 5:
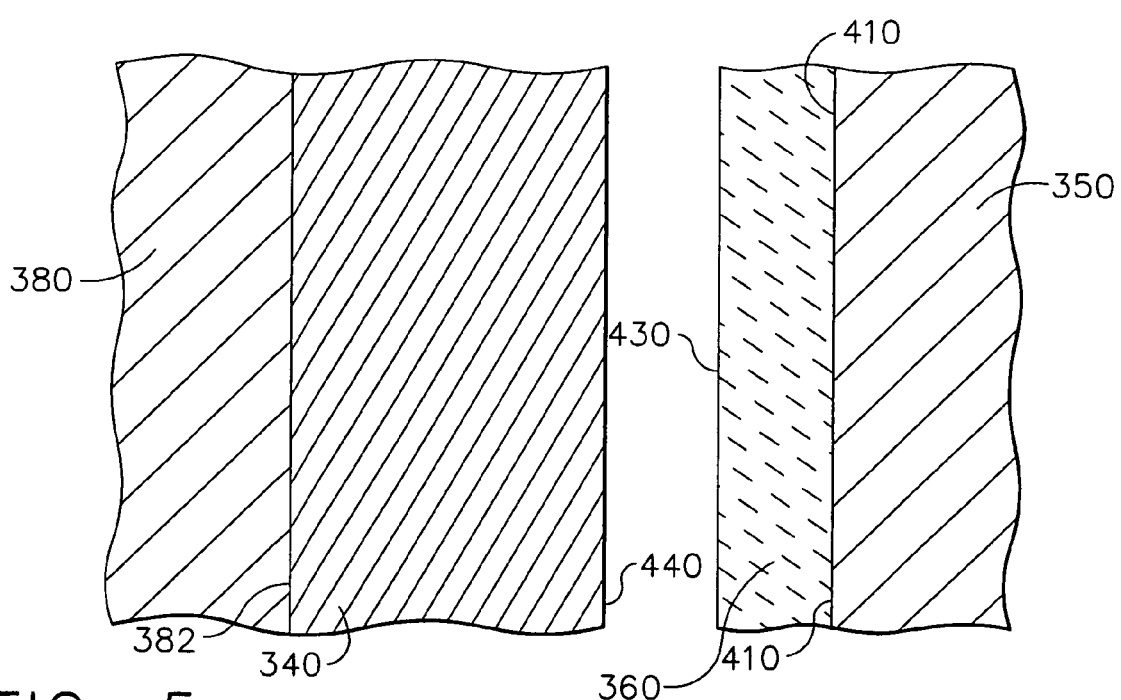
FIG. 5 is an enlarged cross-sectional view of a coating system according to an embodiment of the present invention.

FIG. 5 shows an enlarged cross-section taken from region 4—4 from FIG. 3 showing an alternate embodiment of the present invention. FIG. 5 shows casing 380, bushing 340, wear coating 360, and vane trunnion 350, substantially as described above with respect to FIG. 3. As in the embodiment illustrated in FIG. 4, wear coating 360 is disposed on surface 410 of vane trunnion 350. Casing surface 382 and bushing 340 are in contact and may experience rubbing due to relative motion of bushing 340 against casing surface 382. The surface 440 of bushing 340 and surface 430 of the wear coating 360 may contact each other and rub against each other in frictional contact. Bushing 340 is removable from casing 380, making replacement of bushing 340 relatively simple. The replacement of bushing 340 can be done without opening the compressor case and removing the vane 355, allowing for easy inspection of the wear coating 360. In addition, the wear coating 360 may easily be provided on the entire surface of the vane 355, without the need for masking materials, which provides addition wear and erosion resistance properties for the vane 355.

Figure 6:
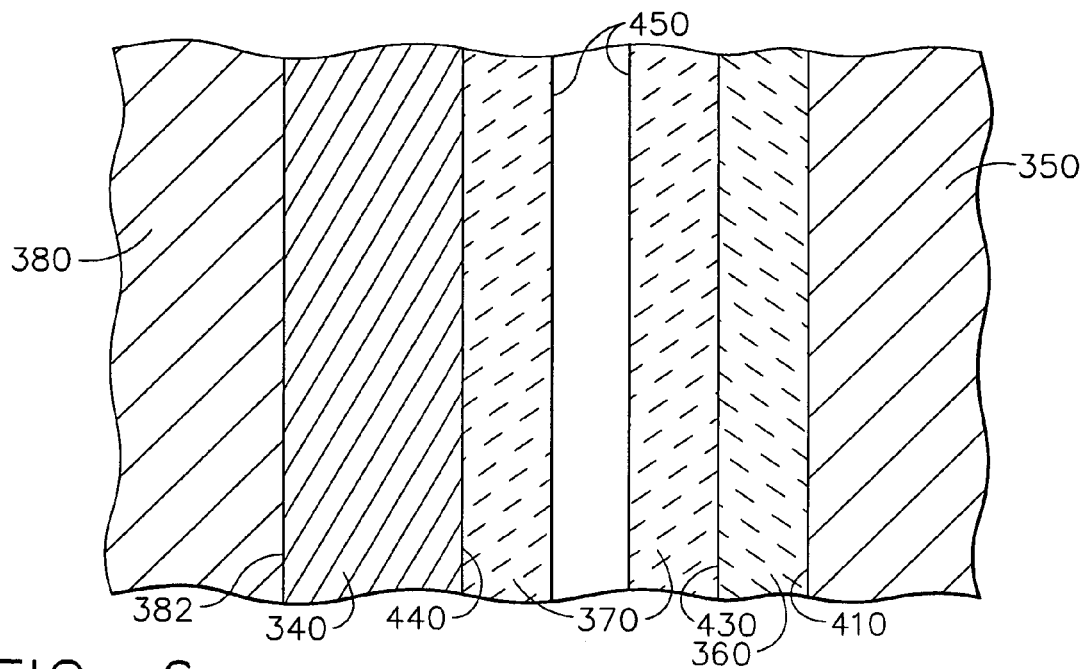
FIG. 6 is an enlarged cross-sectional view of a coating system according to another embodiment of the present invention.
Figure 7:
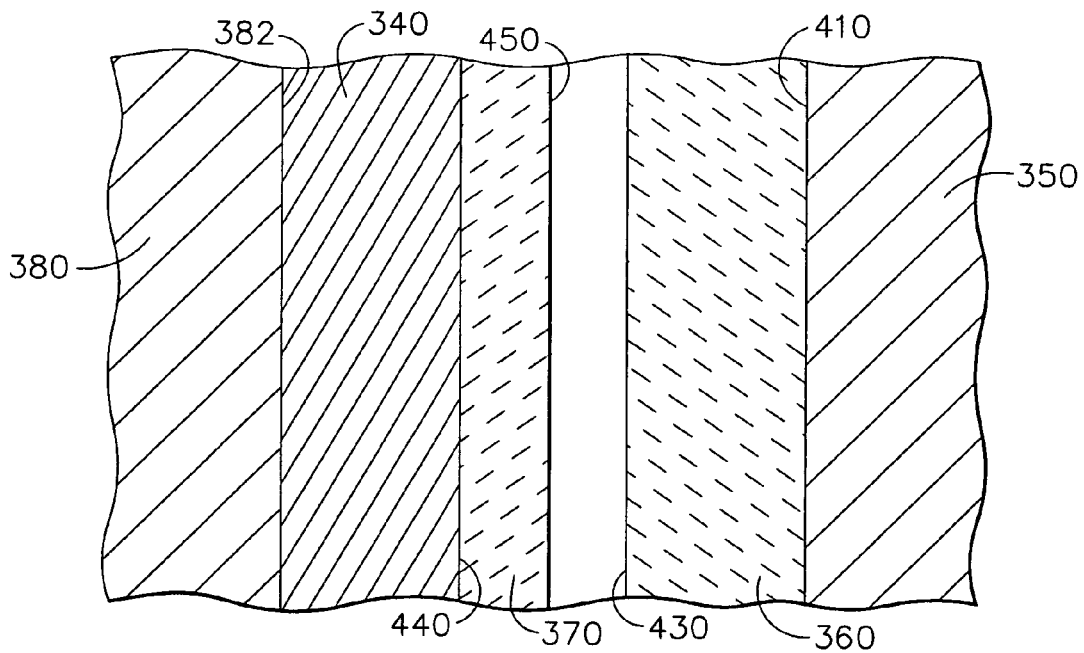
FIG. 7 is an enlarged cross-sectional view of a coating system according to still another embodiment of the present invention.

FIG. 6 shows an enlarged cross-section taken from region 4—4 from FIG. 7 showing an alternate embodiment of the present invention. FIG. 6 shows casing 380, bushing 340, wear coating 360, and vane trunnion 350, substantially as described above with respect to FIG. 5. As in the embodiment illustrated in FIG. 5, wear coating 360 is disposed on surface 410 of vane trunnion 350. Casing surface 382 and bushing 340 are in contact and may experience rubbing due to relative motion of bushing 340 against casing surface 382. In the embodiment illustrated by FIG. 6, the surface 440 of bushing 340 is coated with an antifriction coating 370. In addition, an antifriction coating 370 is present on the wear coating 360. The antifriction coating surfaces 450 may contact each other and rub against each other in frictional contact. The embodiment shown in FIG. 6 has the benefit that antifriction coating 370 is coated onto bushing 340 and onto wear coating 360. Bushing 340 is removable from casing 380, making replenishment of the coating 370 relatively simple by replacing the entire coated bushing 340. The replacement of bushing 340 may be done without opening the compressor case and removing the vane 355. Therefore, the application of antifriction coating 370 requires less equipment and labor than applying antifriction coating 370 to surface 430 of wear coating 360. Additionally, material comprising antifriction coating 370 migrates from location to location along surface 440 of bushing 340 and along surface 430 of wear coating 360, providing uniform distribution of antifriction coating 370 and regeneration of antifriction coating 370 in areas having less antifriction coating material. In service, bushing 340 can be readily replaced with a replacement bushing carrying a fresh supply of antifriction coating 370. In addition, the application of antifriction coating 370 on both the bushing 340 and wear coating 360 provides greater coverage of antifriction coating 370, increasing the reliability of the coating system.

FIG. 7 shows an enlarged cross-section taken from region 4—4 from FIG. 4 showing an alternate embodiment of the present invention. FIG. 7 shows casing 380, bushing 340, wear coating 360, and vane trunnion 350, substantially as described above with respect to FIG. 5. As in the embodiment illustrated in FIG. 5, wear coating 360 is disposed on surface 410 of vane trunnion 350. Casing surface 382 and bushing 340 are in contact and may experience rubbing due to relative motion of bushing 340 against casing surface 382. In the embodiment illustrated by FIG. 7, the surface 440 of bushing 340 is coated with an antifriction coating 370. Unlike the embodiment shown in FIG. 6, no antifriction coating 370 is present on the wear coating 360. The antifriction coating surface 450 and surface 430 of the wear coating 360 may contact each other and rub against each other in frictional contact. The embodiment shown in FIG. 7 has the benefit that antifriction coating 370 is coated onto bushing 340. Bushing 340 is removable from casing 380, making replenishment of the coatings 370 relatively simple by replacing the entire coated bushing 340. The replacement of the bushing 340 and the antifriction coating 370 can be done without opening the compressor case and removing the vane 355. Therefore, the application of antifriction coating 370 requires less equipment and labor than applying antifriction coating 370 to surface 430 of wear coating 360. Additionally, material comprising antifriction coating 370 migrates from location to location along surface 440 of bushing 340, providing uniform distribution of antifriction coating 370 and regeneration of antifriction coating 370 in areas having less antifriction coating material. In service, bushing 340 can be readily replaced with a replacement bushing carrying a fresh supply of antifriction coating 370.

Figure 8:
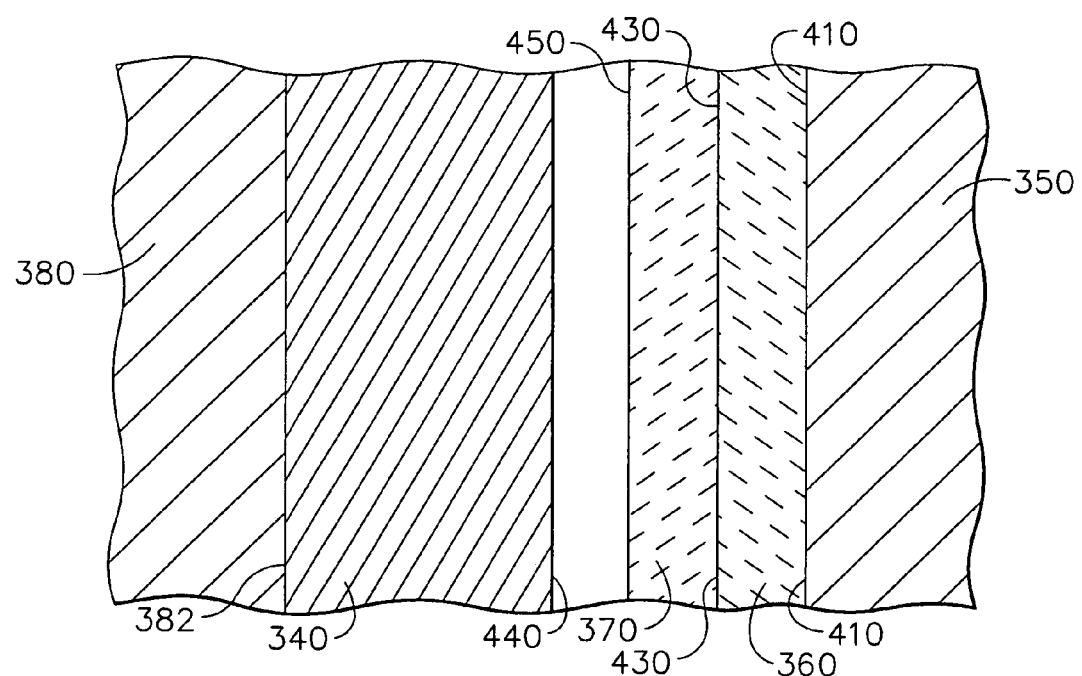
FIG. 8 is an enlarged cross-sectional view of a coating system according to still another embodiment of the present invention.

FIG. 8 shows an enlarged cross-section taken from region 4—4 from FIG. 4 showing an alternate embodiment of the present invention. FIG. 8 shows casing 380, bushing 340, wear coating 360 and vane trunnion 350 substantially as described above with respect to FIG. 5. As in the embodiment illustrated in FIG. 5, wear coating 360 is disposed on surface 410 of vane trunnion 350. Casing surface 382 and bushing 340 are in contact and may experience rubbing due to relative motion of bushing 340 against casing surface 382. In the embodiment illustrated by FIG. 8, surface 430 of wear coating 360 is coated with antifriction coating 370. Unlike FIGS. 6 and 7, no antifriction coating 370 is initially present on bushing 340. In this embodiment, surface 450 of antifriction coating 370 and surface 440 of bushing 340 may contact each other and rub against each other in frictional contact. The embodiment shown in FIG. 8 has the benefit that antifriction coating 370 is coated onto wear coating 360 providing desirable tribological properties. In particular, the combination of the hard, wear resistant wear coating 360 and the soft, lubricious antifriction coating 370 provide sliding surfaces that simultaneously have a low coefficient of friction and increased wear resistance. Additionally, material making up antifriction coating 370 migrates from location to location along the surface 430 of wear coating 360, providing uniform distribution of antifriction coating 370 and regeneration of antifriction coating 370 in areas having less antifriction coating material. Applying antifriction coatings 370 to the entire vane trunnion 350 and upper face of the vane button 320 is a simple procedure and provides additional wear resistance to the vane 355. Inspection of the antifriction coating 370 and wear coating 360 on the vane trunnion 350 is also simple due to easy accessibility.

While FIGS. 3–8 illustrate a bushing 340 and washer 330 configuration with an elongated cylindrical opening through the casing 380, which is known as a high boss design, the coating systems of the present invention are suitable for any variable stator vane configurations known in the art having wear surfaces. The alternate variable stator vane configurations include, but are not limited to, bushing arrangements with shortened openings through the casing, which is known as low boss designs, bushing arrangements having more than one bushing, bushing arrangements having multiple bores through the casing, variable stator vane bearing arrangements having no bushings, and combinations thereof. The present invention may utilize the combination of the relatively hard wear coating 360 in combination with a separate, relatively soft, lubricious antifriction coating 370, which may be placed on wear surfaces, including wear coatings 360 and component surfaces, within the variable stator vane assembly.

The bushing assembly 310 can assume several configurations. One inexpensive alternative utilizes cylindrical bushings 340 with washers 330 as described, wherein flanged bushings having a unitary or semi-unitary bushing utilizing a flange to provide a barrier between the casing 380 and the vane button 320. In addition to reduced cost, the bushing 340 and washer 330 arrangement minimizes possible tensile forces that could cause failure of the ceramic. Alternate configurations of the spacer bushing that separate the bearing bushing may be utilized. Alternate spacer bushing designs may increase the flexibility of the spacer so it may act with the flexibility of a seal.

Figure 9:
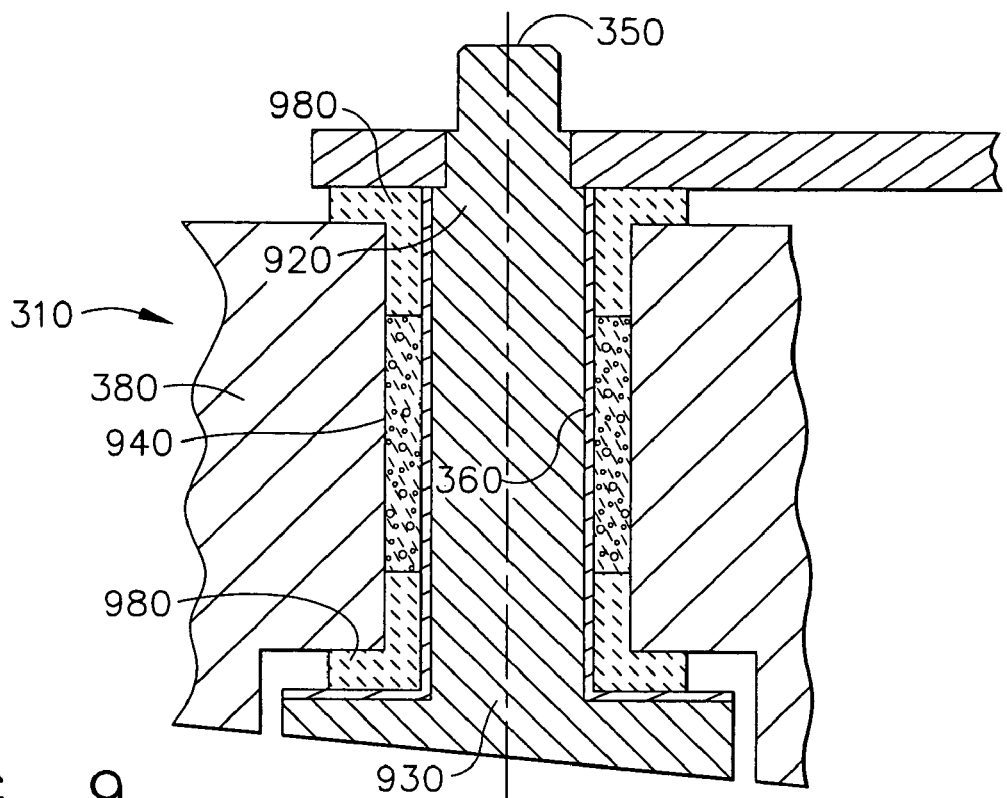
FIG. 9 is a cross-sectional view of a bushing assembly of the present invention used in a variable vane assembly of the present invention.

Referring to FIG. 9, which depicts a bushing configuration of the present invention, a bushing assembly is comprised of a first end 920, a second end 930 and a seal tube portion 940 intermediate to the first end 920 and the second end 930. The first end 920 and second end 930 shown in FIG. 9 includes flanged sections 980, which are comprised of ceramic or metallic material. The metallic vane 350 extends through the bushing assembly disposed within casing 380. The vane stem 350 is preferably fabricated from a stainless steel such as A286. The composition for A286 is well-known in the art and is the designation for a stainless steel comprising about 0.15 weight percent aluminum, about 0.006 weight percent boron, about 0.04 weight percent carbon, about 14.5 weight percent chromium, about 0.2 weight percent manganese, about 1.25 weight percent molybdenum, about 25 weight percent nickel, about 0.015 weight percent phosphorous, about 0.002 weight percent sulfur, about 0.2 weight percent silicon, about 2.1 weight percent titanium, about 0.3 weight percent vanadium and balance iron. However, the vane stem 350 may be fabricated from any suitable material including, but not limited to Ti 6-4, M152, Inconel® 718, 17-4 PH and Waspaloy. The composition of Ti-6-4 is well-known in the art and is a designation for a titanium alloy comprising about 6 weight percent aluminum and about 4 weight percent vanadium and balance titanium. The composition of M152 is well-known in the art and is a designation for a stainless steel comprising about 12 weight percent chromium, about 2.5 weight percent nickel, about 1.8 weight percent molybdenum, about 0.1 weight percent carbon, about 0.3 weight percent vanadium and balance iron. INCONEL® is a federally registered trademark owned by Huntington Alloys Corporation of Huntington, W.Va. The composition of INCONEL® 718 is well-known in the art and is a designation for a nickel-based superalloy comprising about 18 weight percent chromium, about 19 weight percent iron, about 5 weight percent niobium+tantalum, about 3 weight percent molybdenum, about 0.9 weight percent titanium, about 0.5 weight percent aluminum, about 0.05 weight percent carbon, about 0.009 weight percent boron, a maximum of about 1 weight percent cobalt, a maximum of about 0.35 weight percent manganese, a maximum of about 0.35 weight percent silicon, a maximum of about 0.1 weight percent copper, and the balance nickel. The composition of 17-4 PH is well-known in the art and is a designation for a stainless steel comprising about 16.5 weight percent chromium, about 4 weight percent nickel, about 3.5 weight percent copper, about 0.3 weight percent niobium, about 0.03 weight percent carbon and balance iron. The composition of Waspaloy is well-known in the art and is a designation for a nickel-based alloy comprising about 1.4 weight percent aluminum, about 0.01 weight percent boron, about 0.05 weight percent carbon, about 13 weight percent cobalt, about 19.5 weight percent chromium, about 1 weight percent iron, about 4.3 weight percent molybdenum, about 3 weight percent titanium, about 0.7 weight percent zirconium, and balance nickel.

The metallic material for use in the bushing assembly may include metallic alloys, such as STELLITE® 6, M152, 17-4 PH, L605 or 410 stainless steel. The metallic bushing include temperature resistance, provide desirable elastic modulus, include a surface suitable for subsequent wear coating and are resistant to wear.

The ceramic materials for use in the bushing assembly may include silicon nitride, tungsten carbide, or zirconia. The ceramic materials used for these bushings are both strong and stiff in their non-porous form. However, the performance of the seal tubes comprising these materials can be improved by reducing the elastic modulus of the seal tube portion 940 of the bushing. This may be accomplished by including from about 10% to about 35% by volume closed pore porosity, and preferably up to 20% closed pore porosity, in this portion of the bushing. By including closed pore porosity in the seal tube portion 940 of the bushing, the elastic modulus is reduced rendering the seal tube portion 940 more elastic and less stiff, even though the seal tube portion 940 is comprised of the same material as the dense bearing bushing at first end 920 and second end 930. The porous ceramic material of the seal tube portion 940 of the bushing has an elastic modulus that is less than the elastic modulus of either first end 920 and second end 930. The elastic modulus is preferably from about 20% to about 50% less than the elastic modulus of a part comprising a non-porous ceramic material of the same composition. More preferably, the elastic modulus is about 50% less than the elastic modulus of a part comprising a non-porous ceramic material of the same composition when there is 20% closed pore porosity. In particular, the porous ceramic material has an elastic modulus that is from about 20% to about 50% less than a non-porous ceramic material having substantially identical composition. The advantage of having a lower elastic modulus in the seal tube portion 940 of the bushing assembly is that interface forces that normally are present in a bushing with a uniform elastic modulus are transmitted to either first end 920 or second end 930. This transmission of forces reduces interface forces and wear in the critical seal area and further extends the life of the bushing assembly.

Figure 10:
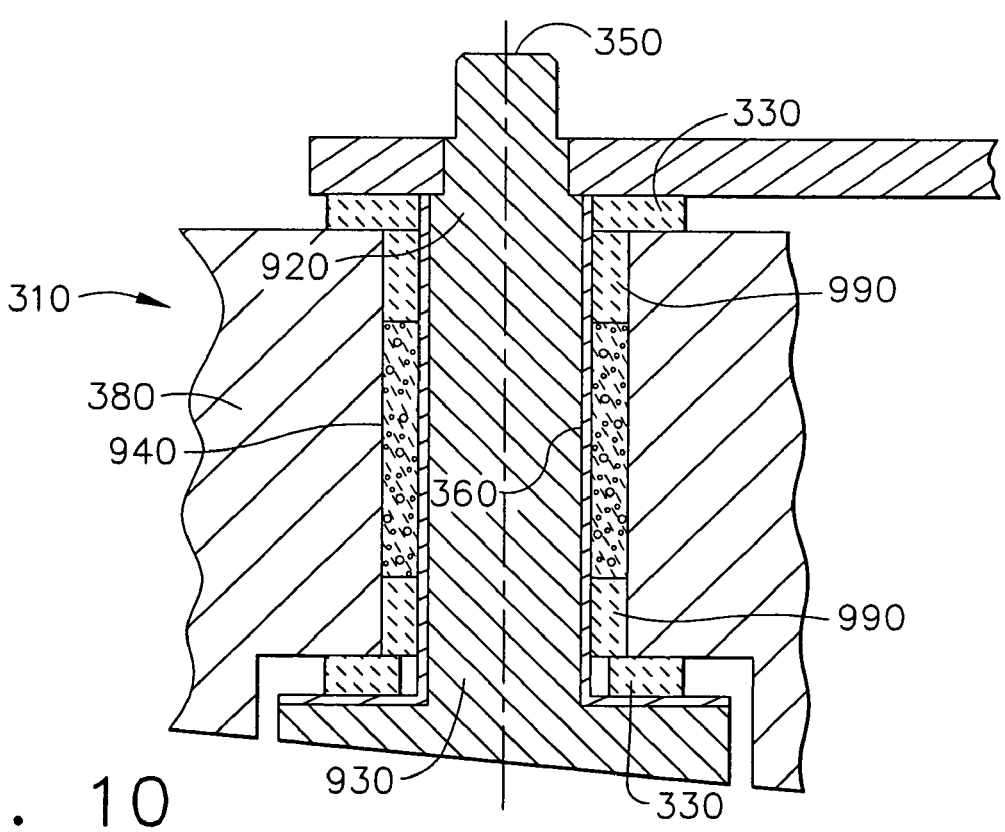
FIG. 10 is a cross-sectional view of a bushing assembly according to an alternate embodiment of the present invention used in a variable vane assembly of the present invention.

Referring now to FIG. 10, there is depicted another embodiment of the bushing assembly having a bushing and washer arrangement. FIG. 10 includes the structure shown in FIG. 9. However, instead of the flanged section 980, FIG. 10 shows the first end 920 and the second end 930 having a straight section 990 with an intermediate seal tube portion 940. In addition, FIG. 10 further shows washers 330 as a part of the first end 920 and the second end 930. Washer 330 at the first end 920 is disposed between the casing 380 and the lever assembly extending from the vane trunnion 350. Washer 330 at the second end 930 is disposed between the casing 380 and the vane trunnion 350.

Figure 11:
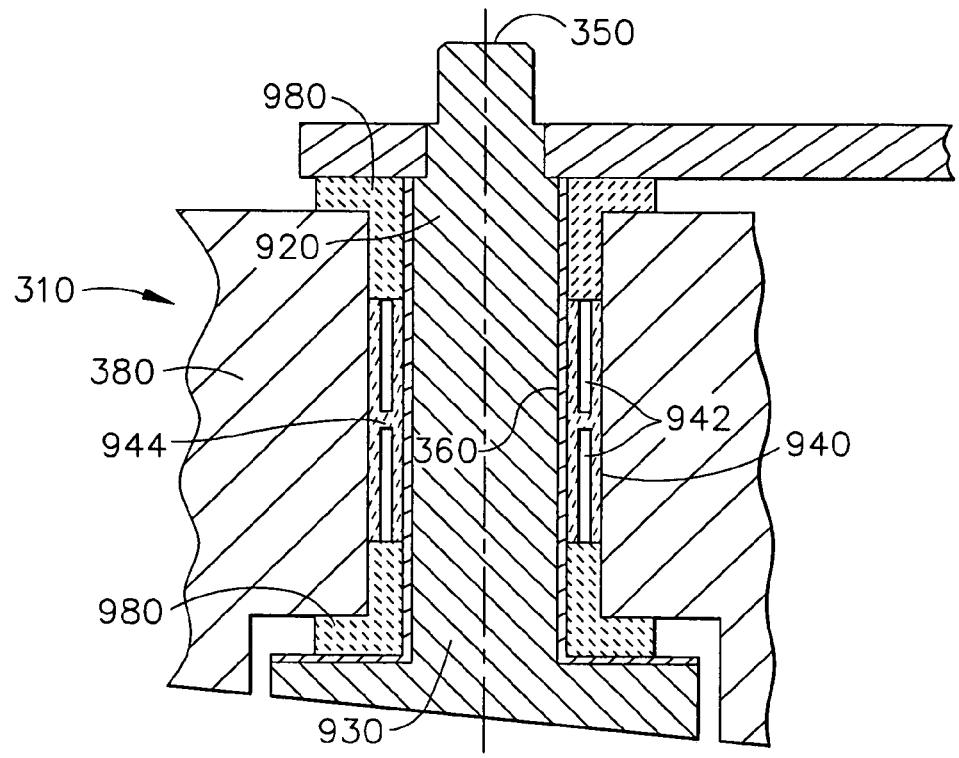
FIG. 11 is a cross-sectional view of a bushing assembly of the present invention used in a variable vane assembly of the present invention depicting a seal tube portion having an H-profile.

Referring now to FIG. 11, there is depicted another embodiment of a bushing assembly. Like the bushing assembly depicted in FIGS. 9 and 10, the bushing assembly 310 may be fabricated from a metallic material, such as STEL-LITE® 6, M152, 17-4 PH, L605 or 410 stainless steel. Alternatively, the bushing assembly may be fabricated from silicon nitride, tungsten carbide, or a zirconium oxide material. Metallic vane trunnion 350 extends through the bushing assembly disposed within casing 380. The bushing assembly includes a first end 920 and a second end 930. First end 920 and second end 930 may be flanged section 980 as shown. The bushing assembly 310 also includes a seal tube portion 940 that has an improved elastic flexibility. However, the improved flexibility is achieved by an H-profile, which includes two circumferential voids 942 separated by a connecting segment 944. This arrangement in cross-section such as given in FIG. 11, appears as an H and hence is referred to as a H-profile. The seal tube portion 940 may be made from the same material as the first end 920 and second end 930. The seal tube portion 940 is modified to provide improved flexibility. As should be clear, the H-profile in the seal tube portion 940 results in this section of the bushing being more flexible. As a result, interface forces in this area as a result of contact between the bushing assembly and vane trunnion 350 are transmitted to first end 920 and second end 930, both of which are dense and stiff. This extends bushing life in the seal tube portion 940 while minimizing frictional forces in the seal tube portion 940. Of course, the flexibility of an H-profile seal tube portion 940 made with 20% closed-pore porosity would be even more flexible, which is also contemplated by the present invention.

Figure 12:
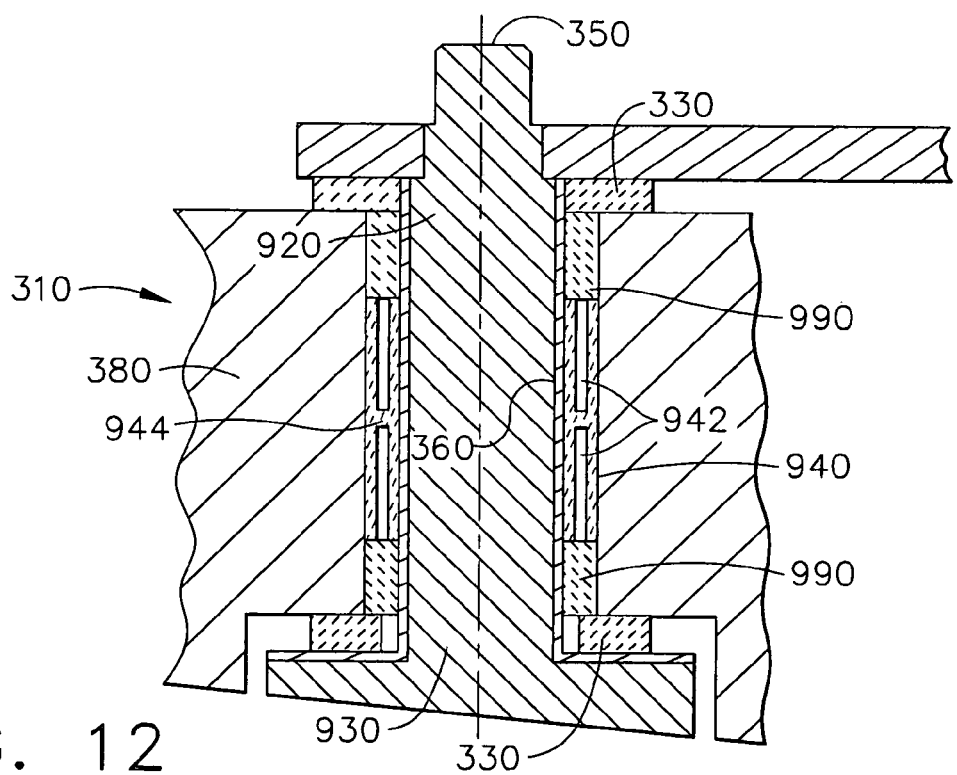
FIG. 12 is a cross-sectional view of a bushing assembly according to an alternate embodiment of the present invention used in a variable vane assembly of the present invention depicting a seal tube portion having an H-profile.

Referring now to FIG. 12, there is depicted another embodiment of the bushing assembly having a bushing and washer arrangement. FIG. 12 includes the structure shown in FIG. 11. However, instead of flanged section 980, FIG. 12 shows the first end 920 and the second end 930 having a straight section 990 with an intermediate seal tube portion 940 disposed therebetween. In addition, FIG. 12 shows washers 330 as a part of the first end 920 and the second end 930. Washer 330 at the first end 920 is disposed between the casing 380 and the lever assembly extending from vane trunnion 350. Washer 330 at the second end 930 is disposed between the casing and the vane trunnion 350.

Figure 13:
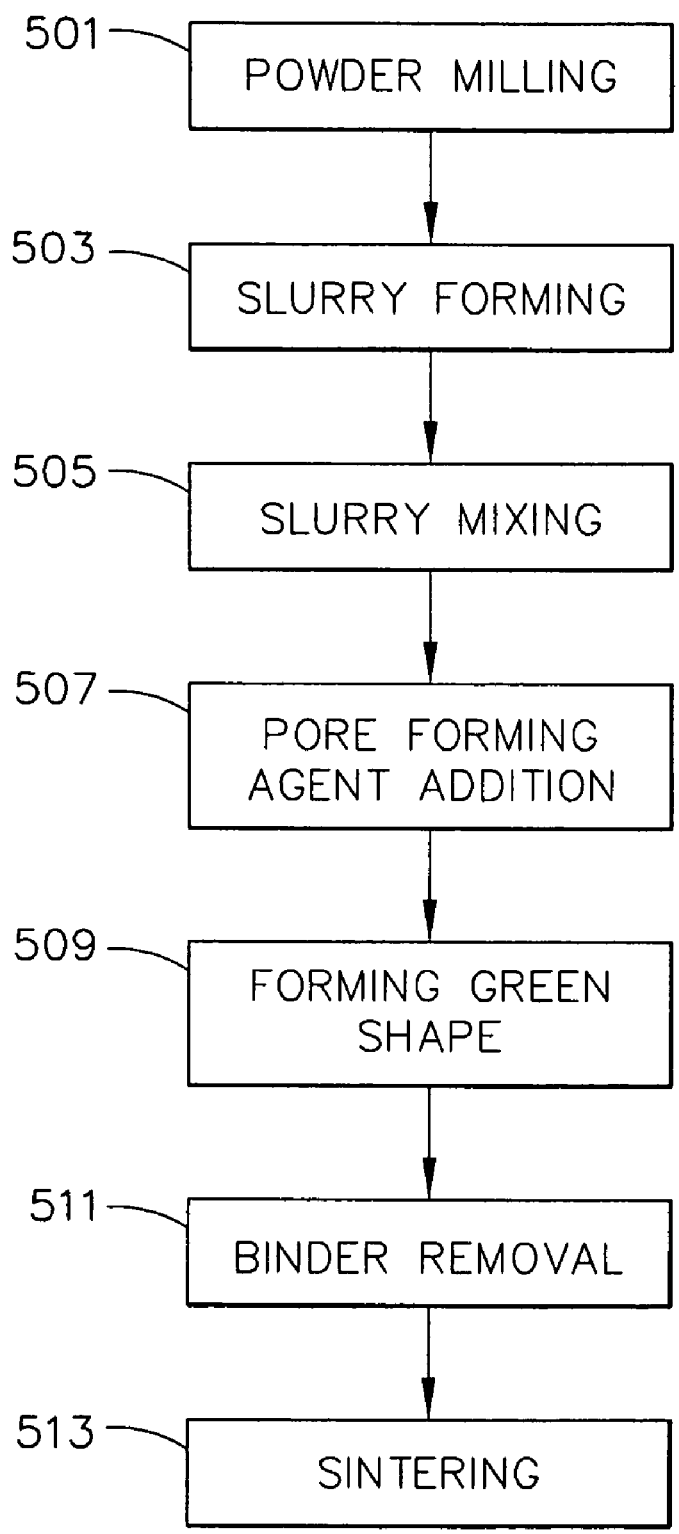
FIG. 13 illustrates a method according to an embodiment of the present invention.

FIG. 13 illustrates a method for forming a porous ceramic seal tube portion 940 according to an embodiment of the present invention. As shown in FIG. 13, in step 501, a powdered ceramic material, such as $Si_3N_4$, tungsten carbide or $ZrO_2$, is powder milled for a suitable time up to about 48 hours to produce power of predetermined size. Additives, such as sintering agents or forming agents may be added to the powdered ceramic material. The powder milling optionally takes place in order to reduce agglomerations and decrease particle size in order to improve the mixing between powders. In step 503, the ceramic powder mixture is then formed into a slurry by addition of solvents and/or polymer binder material in order to form a slurry comprising from about 40% to about 60% solid by weight. The formed slurry from step 503 is then mixed, preferably in a ball mill, for about 24 hours to about 2 weeks in step 505.

Upon completion of the slurry mixing step 505, a pore forming agent is added to the slurry in step 507. The pore forming agent of step 507 may be any material capable of forming pores in a sintered ceramic material. In particular, the pore forming agent is a material added to the formed green (i.e., unsintered) part that results in pores within the sintered ceramic material once the sintering step takes place. Suitable pore forming agents include, but are not limited to, hollow or solid polymer spheres, glass spheres, ceramic spheres, particles of organic material or blowing agents. Blowing agents are any materials that decompose to release gas and form pores within the ceramic material. The pore forming agents are mixed into the slurry for from about 2 minutes to about 48 hours.

After the pore forming mixing step 507, the green shape is formed in step 509. A green shape is formed from a slurry that has not been sintered and may be formed and/or shaped into a desired geometry. The forming and/or shaping may take place using any known forming and/or shaping process, including, but not limited to, injection molding, casting or otherwise forming under pressure. The forming step 509 may also include additional steps such as addition of initiators, addition of sintering agents or other additives, and degassing the slurry.

After forming step 509 takes place, the formed green shape is then sintered. Sintering takes place by first removing the binder. The binder removal step takes place by heating to 600° C. and soaking for about 0.1 hours to about 3 hours. Heating to the binder removal temperature may take place at any suitable rate. Suitable heating rates to the binder removal temperature include from about 30° C. to about 50° C./hour. The binder removal step may result in some additional porosity resulting from the decomposition of the binder and/or solvent within the green shape. After the binder has been sufficiently removed, the part is heated to a temperature of about 1650° C. to about 1850° C. for times of about 0.5 hours to about 1.5 hour. Suitable heating rates to the sintering temperature include from about 20° C. to about 50° C./hour. The sintered ceramic material results in a porous, sintered product having a near-net shape. A product having a near-net shape is a finished product having a reduced or eliminated amount of machining prior to installation, such as installation into a gas turbine engine. In an embodiment of the present invention, wherein the bushing comprises a cylindrical seal tube of the porous ceramic material, the excess material present and requiring machining (e.g., excess material present on the inside diameter and/or outside diameter of the seal tube) is preferably less than about 0.025 inches. More preferably, the excess material present and requiring machining is less than about 0.020 inches. Still more preferably, the excess material present and requiring machining is less than about 0.010 inches.

In the present invention, to further reduce the wear and friction forces between the vane 350 and the ceramic bushing assemblies in FIGS. 9–12, the vane trunnion 350 is coated with a WC, titanium nitride or WC—Co wear coating 360. Wear coating 360 is provided on metal surfaces to provide a surface having desirable wear properties, such as high hardness and wear resistance. Materials used in the variable stator vane system include materials that are suitable for receiving the wear coating 360. Suitable material for receiving wear coating 360 include, but are not limited to, nickel-based superalloys, titanium and its alloys, cobalt-based superalloys, iron-based superalloys and stainless steel. Wear coating 360 provides a surface that has the properties of being both hard and smooth and capable of receiving an antifriction coating 370. In one embodiment of the present invention, the vane trunnion 350 is coated with a cemented tungsten carbide. Cemented tungsten carbides include those tungsten carbides that include a sufficient amount of cobalt to impart wear resistance. Sufficient amounts of cobalt are typically about 6–20% by weight and preferably about 12% by weight. The wear coating 360 may be applied by a plasma spray technique or other suitable method known in the art. A suitable plasma spray technique is high velocity oxy-fuel (HVOF) spraying, although other plasma spray techniques such as low-pressure plasma spray (LPPS) and air plasma spraying (APS) may be used to successfully apply the coating. Alternatively, the vane trunnion 350 may be coated with a physical vapor deposition (PVD) deposited wear coating 360 of titanium nitride or tungsten carbide. The preferred coating is a relatively thin wear coating 360 of titanium nitride or tungsten carbide applied by PVD. Suitable titanium nitrides for use as wear coating 360 include, but are not limited to, TiN, TiAlCrN and TiAlN. The titanium nitrides are not limited to coatings have a single compositional layer and may include multiple compositional layers. For example the TiAlCrN coating may include compositional layers including TiAlN and CrN. This wear coating 360 may be applied to a thickness as low as about 0.0002 inches and as high as about 0.010. Preferably, the coating thicknesses are in the range from about 0.0005 to about 0.005 inches, most preferably coating thickness of about 0.001 inches. The resultant wear coating 360 provides a hard, smooth surface resistant to wear. In one embodiment of the invention, the entire surface of vane 350, 355, including the airfoil, is provided with a wear coating 360. The application of a wear coating on the entire vane 350, 355 simplifies processing, wherein little or no masking is required and provides desirable properties to the vane 350, 355 and the airfoil, including but not limited to additional corrosion and erosion resistance.

The wear coating 360 provides significant resistance to wear in the variable stator vane assembly according to the present invention without the presence of the antifriction coating 370 (see e.g., FIGS. 3, 5 and 9–12). Table 1 shows relative wear rates in mils (1/1000 inch) per 1 million cycles (i.e., reciprocations) for various vane and bushing systems at 75° F., 400° F. and 750° F. wherein no antifriction coating 370 is applied. The wear is measured both as the deepest pit in the surface of the vane to a fixed point (i.e., Vane Wear) in mils per 1 million cycles and the total average amount of wear (i.e., Total Wear) in mils per 1 million cycles. The wear measurements making up the Total Wear shown in Table 1 include measurements of distances between fixed points on each of the testing vehicle having the vane surface material and testing vehicle having the bushing surface material. A negative wear number signifies a reduction in the distance between the fixed points and a positive wear number signifies an increase in distance between the fixed points. Also shown in Table 1 is the maximum coefficient of friction for the materials present. The vane surface material is the material present at the outermost surface of the vane, including the wear coating 360, if any. In each example according to the present invention (i.e., Ex. 1–10), the vane fabricated from A286 stainless steel is coated with a wear coating 370, according to an embodiment of the present invention. The bushing surface material is the material present at the outermost surface of the bushing opposing vane 350, which may be the material from which the vane 350 is fabricated. Comparative Examples 1–5 include uncoated vane materials in frictional contact with the bushing surface material.

TABLE 1

| | | | Relative Wear Rate (mils per 1 million cycles) | | | | | | | |
|---|---|---|---|---|---|---|---|---|---|---|
| | Vane | Bushing | 75° F. | | | 400° F. | | | 750° F. | | |
| | Surface Material | Surface Material | Total Wear | Vane Wear | COF | Total Wear | Vane Wear | COF | Total Wear | Vane Wear | COF |
| Comp. Ex. 1 | A286 | M152 | −66.5 | −154 | 1.3 | 34* | −243 | 0.9 | −3.5 | −7.4 | 1 |
| Comp. Ex. 2 | A286 | M152 | −111 | −177 | 0.8 | −20.8 | −25.8 | 0.9 | −1.3 | −3 | 0.9 |
| Comp. Ex. 3 | A286 | 17-4PH | NT | NT | NT | −30.1 | −49.7 | 1 | NT | NT | NT |
| Comp. Ex. 4 | Waspaloy | L605 | 765 | −99 | 0.7 | −49.3 | −98.8 | 0.8 | 0.6 | −2.9 | 0.7 |
| Comp. Ex. 5 | Waspaloy | L605 | −43.7 | −90 | 0.3 | −39.3 | −108 | 0.8 | 0.6 | −2.5 | 0.7 |
| Ex. 1 | WC | Si$_3$N$_4$ | 0 | −0.1 | 0.9 | −3.5 | −1.7 | 0.9 | 0.1 | −0.2 | 0.9 |
| Ex. 2 | WC | Si$_3$N$_4$ | 0.1 | −0.1 | 0.9 | 0 | −0.2 | 1.1 | 0.1 | −0.1 | 0.9 |
| Ex. 3 | WC | M152 | −13.4 | −0.7 | 0.9 | −0.4 | −0.9 | 0.8 | −0.8 | −0.5 | 0.9 |
| Ex. 4 | WC | M152 | NT | NT | NT | −1.1 | −0.6 | 0.9 | NT | NT | NT |
| Ex. 5 | TiAlCrN | Si$_3$N$_4$ | −3.2 | −3.6 | 1 | −7.1 | −8.1 | 1.2 | −0.7 | −1.6 | 0.8 |
| Ex. 6 | TiAlCrN | Si$_3$N$_4$ | NT | NT | NT | −8.2 | −8.1 | 1.1 | NT | NT | NT |
| Ex. 7 | TiAlCrN | M152 | −5.1 | −0.1 | 1 | −0.8 | −0.4 | 0.9 | −0.4 | −4.8 | 0.8 |

TABLE 1-continued

| | | | Relative Wear Rate (mils per 1 million cycles) | | | | | | | | |
|---|---|---|---|---|---|---|---|---|---|---|---|
| | Vane | Bushing | 75° F. | | | 400° F. | | | 750° F. | | |
| | Surface Material | Surface Material | Total Wear | Vane Wear | COF | Total Wear | Vane Wear | COF | Total Wear | Vane Wear | COF |
| Ex. 8 | TiAlCrN | M152 | NT | NT | NT | −0.8 | −0.4 | 0.9 | NT | NT | NT |
| Ex. 9 | TiAlCrN | M152 | NT | NT | NT | −1.6 | −0.3 | 0.9 | NT | NT | NT |
| Ex. 10 | TiAlN | 17-4PH | −66.9 | −77 | 0.9 | −1.8 | −0.5 | 0.8 | −0.4 | −0.2 | 0.7 |

*Specimen Was Severely Galled
NT—Not Tested

In addition to wear resistance, as shown in Table 1, the material having the wear coating 360 of the present invention preferably maintains a fatigue strength greater than or equal to 90% of the fatigue strength of the uncoated material. Fatigue strength of coated materials is shown in Table 2.

TABLE 2

| | | | | | Control Fatigue | Fatigue Strength of Coated Specimens as Percent of Control at 1 Million Cycles | | | |
|---|---|---|---|---|---|---|---|---|---|
| | YS | UTS | Modulus | Fatigue Test Temperature | Strength Bare | TiAlCrN | TiN | B4C | TiAlN |
| Alloy | ksi | ksi | Mpsi | F. | ksi | % | % | % | % |
| A286 | 116.6 | 172.8 | 30.1 | 600 | 54 | 100 | 100 | 85 | 100 |

As shown in Table 2, A286 steel maintains 100% of the uncoated A286 fatigue strength when coated with TiAlCrN, TiN and TiAlN. The preferred wear coatings have a reduced reduction of fatigue strength than other wear coating materials, such as $B_4C$, which has 85% of the uncoated A286 fatigue strength.

The present invention may also utilize a solid, but soft, antifriction coating 370 placed between the bushing and the WC or WC—Co coated vane trunnion 350, preferably on at least one of the surface of the wear coating 360 and the surface of the bushing 340. This antifriction coating 370 is shown in FIGS. 4 and 6–8. The antifriction coating 370 is preferably coated on a surface of the wear coating 360, but may also be applied to the inside surface of the bushings 440 and seal tube portion 940, as well as the surface of washers 330.

One embodiment of the present invention includes a variable stator vane assembly 310 having a vane structure 355 having a vane trunnion 350 at least partially disposed inside an opening in a casing 380, a wear coating 360 on at least a portion of the surface of the vane structure, an antifriction coating 370 on at least a portion of the wear coating 360, and a bushing 340 disposed between the antifriction coating 370 and the casing 380. During engine operation, the combination of wear coating 360 and antifriction coating 370 maintains a low coefficient of friction in high altitude atmospheres. The coefficient of friction maintained in the wear system of the variable stator vane in operating conditions (e.g., high temperature, high vibration, and high altitude atmosphere exposure) is equal to or less than 0.6 and preferably equal or less than 0.4. The coefficient of friction is measured between the two surfaces rubbing against each other within the variable stator vane assembly 310. In the embodiment of the present invention shown in FIG. 6, the coefficient of friction between antifriction coating 370 on bushing 340 and antifriction coating 370 on wear coating 360, is less than or equal to about 0.6. In the embodiment of the present invention shown in FIG. 7, the coefficient of friction between antifriction coating 370 and wear coating 360, is less than or equal to about 0.6. In the embodiment of the present invention shown in FIG. 8, the coefficient of friction between antifriction coating 370 and bushing 340 is less than or equal to about 0.6.

The antifriction coating 370 comprises a binder, a friction modifying agent, and, optionally, an additive. The binder of the antifriction coating 370 comprises a material selected from the group consisting of sodium silicate, aluminum phosphate, titanium oxide and combinations thereof. The friction-modifying agent is preferably dispersed substantially uniformly through the binder. The antifriction coating 370 reduces the coefficient of friction between the bushing system and wear coating 360. Of the antifriction coating binders, aluminum phosphate and titanium oxide are preferred. As the variable stator vane bushing assembly operates, the antifriction coating 370 may eventually be consumed. The antifriction coating 370 is resilient and regenerates in areas where the coating is rubbed thin or cleaned off the wear surface. The antifriction coating 370 is thin when the thickness on a portion of the surface is insufficient to provide sufficient lubricity to the sliding surfaces to maintain the coefficient of friction at the desired level. During operation, the antifriction coating 370 may migrate from location to location along the wear surface. The migration of the antifriction coating 370 allows areas that have less material or are rubbed completely off to receive antifriction coating material from other locations along the wear surface to regenerate the coating missing from the area rubbed thin or completely off.

The binder material for use in the antifriction coating 370 is any binder material that is tribologically compatible with all of the following materials: 1) water, 2) detergents used in the cleaning of gas turbine engine parts, 3) deicers known in the art used to deice aircraft in winter, 4) aircraft fuel, 5) oil and 6) hydraulic fluid. The materials are tribologically compatible if the binder in the antifriction coating 370 maintains tribological properties (e.g., lubricity and wear resistance) of the antifriction coating 370 when in contact with the surfaces subjected to sliding friction and in contact with the materials listed above. In order to maintain tribological properties, the binder exhibits the ability to remain coated on the substrate, does not result in separation of the friction modifier and the binder, and does not result in substantial softening of the antifriction coating. Suitable binder materials include, but are not limited to, sodium silicate, aluminum phosphate, titanium oxide and combinations thereof. Binders that provide the highest tribological compatibility include titanium oxide and aluminum phosphate.

The friction modifier is any material that, when added to the binder, produces a friction coefficient suitable for rotating a stator vane in a variable stator vane assembly, capable of maintaining desirable tribological properties at high altitude atmospheres and/or high temperatures. The high altitude atmospheres include atmospheres to which aircraft are exposed during flight. The high altitude atmosphere includes atmospheres having reduced water vapor. High temperature exposure is a result of the operation of the gas turbine engine. The compression of the gas and the combustion of the fuel result in high temperatures in gas turbine engines. Parts within the gas turbine engine are subject to high temperatures. The coating system of the present invention may find uses in parts within the gas turbine engine that are exposed to temperatures up to about 1200° F. Desirable tribological properties include, but are not limited to low coefficient of friction between sliding surfaces (i.e., high lubricity) and low wear between sliding surfaces. Suitable friction modifier materials include, but are not limited to, tungsten sulfide (e.g., $WS_2$), bismuth telluride (e.g., $Bi_2Te_3$), copper sulfide (e.g., $Cu_2S$), bismuth oxide (e.g., $Bi_2O_3$) and combinations thereof. Of the friction modifiers, tungsten sulfide (e.g., $WS_2$), bismuth telluride (e.g., $Bi_2Te_3$) and bismuth oxide (e.g., $Bi_2O_3$) are preferred.

Table 3 shows examples of antifriction coating materials according to the present invention. These examples do not limit the invention to the combinations of binders and friction modifiers shown therein. Examples 11–15, shown in Table 3, include coefficient of friction (COF) results for particular friction modifier and binder combinations. In order to determine the coefficient of friction, the antifriction coating materials are subject to a sliding wear test as known in the art. The tests were conducted with a reciprocating stroke length of 0.060 inches. Antifriction coating material (i.e., inert material, binder and friction modifier) were loaded onto the wear surfaces and dried to form an antifriction coating 370. The coated wear surfaces were then subject to a load of 50 lbs. and reciprocation motion. The coefficients of friction were measured at various temperatures during the test and an average coefficient (i.e., Avg COF) of friction was calculated as the coefficient of friction for the wear system. Table 3 shows an average coefficient of friction for each example having the average coefficient of friction resulting from tests run at various friction modifier to binder loadings. The antifriction coating 370 was formed from drying a composition on the test surface having a binder loading of 10% by weight and friction modifier loadings of from 15% by weight to 25%, corresponding to friction modifier to binder weight ratios of from 1.5:1 to about 2.5:1. The balance of the composition is of essentially inert material that is removed during drying.

TABLE 3

| Ex. | Binder 10% | Friction Modifier | COF Initial | COF Room Temp. | COF at 400° F. | COF at 750° F. | Avg. COF |
|---|---|---|---|---|---|---|---|
| 11 | Titanium Oxide | Tungsten Sulfide | 0.2 | 0.5 | 0.4 | 0.6 | 0.43 |
| 12 | Titanium Oxide | Bismuth Telluride | 0.3 | 0.7 | 0.7 | 0.6 | 0.58 |
| 13 | Titanium Oxide | Bismuth Oxide | 0.2 | 0.7 | 0.7 | 0.6 | 0.55 |
| 14 | Titanium Oxide | Copper Sulfide | 0.3 | 0.6 | 0.7 | 0.6 | 0.55 |
| 15 | Aluminum Phosphate | Tungsten Sulfide | 0.3 | 0.4 | 0.5 | 0.5 | 0.43 |

The friction modifier is preferably incorporated into antifriction coating in a ratio of friction modifier to binder of about 0.1:1 to about 5:1. More preferably, the friction modifier is incorporated into the antifriction coating in a ratio of friction modifier to binder of about 1:1 to about 3.5:1. The friction modifier is incorporated into the binder material and is preferably encapsulated in the binder material. Encapsulation may take place using any suitable encapsulation method, including but not limited to, powder metallurgical encapsulation methods. The antifriction coating 370, including the binder and friction modifier, is coated onto the surfaces subject to wear (i.e., wear surface). Suitable methods for coating include, but are not limited to, spraying or dipping the surface to be coated with an antifriction coating 370 and subsequently drying the antifriction coating 370, removing at least some of the inert material present. The dried surface forms an antifriction coating 370 that is tenacious and substantially uniform across the wear surface. Optionally, the antifriction coating 370 may be heated during the drying step. Table 4 shows the average coefficient of friction and wear in inches for various friction modifier loadings in the coating composition. In addition, Table 4 shows the average number of sliding cycles (i.e. reciprocations) used in Examples 16–21 at room temperature, 400° F. (204° C.), and 750° F. (399° C.), which resulted in the average wear shown.

TABLE 4

| Ex. | Binder (10% Loading) | Friction Modifier | Friction Modifier Loading (%) | Friction Modifier to Binder Weight Ratio | Avg. COF | Average Wear (inches) | Average Sliding Cycles |
|---|---|---|---|---|---|---|---|
| 16 | Titanium Oxide | Tungsten Sulfide | 25 | 2.5:1 | 0.47 | 0.001–0005 | 575,000 |
| 17 | Titanium | Tungsten | 30 | 3.0:1 | 0.59 | 0.001–0.005 | 600,000 |

TABLE 4-continued

| Ex. | Binder (10% Loading) | Friction Modifier | Friction Modifier Loading (%) | Friction Modifier to Binder Weight Ratio | Avg. COF | Average Wear (inches) | Average Sliding Cycles |
|---|---|---|---|---|---|---|---|
| 18 | Titanium Oxide | Tungsten Sulfide | 35 | 3.5:1 | 0.40 | 0.001–0.005 | 625,000 |
| 19 | Titanium Oxide | Bismuth Telluride | 25 | 2.5:1 | 0.59 | 0.001–0.004 | 350,000 |
| 20 | Titanium Oxide | Bismuth Telluride | 30 | 3.0:1 | 0.54 | 0.001–0.004 | 362,500 |
| 21 | Titanium Oxide | Bismuth Telluride | 35 | 3.5:1 | 0.55 | 0.001–0.004 | 312,500 |

Although the average shown in Table 4 range from 350,000 to 635,000 cycles, in Examples 16–21, 1,000,000 sliding cycles were made at 750° F. (399° C.).

The variable stator vane assembly of the present invention having the wear coating 360, antifriction coating 370 and the bushing system opposed surface combination preferably also is resistant to wear over the entire operating temperature range of the vane 350. In one embodiment of the present invention, the opposed surfaces wear less than about 0.005 inches after at least 500,000 reciprocations (i.e., cycles). In another embodiment, the wear coating 360 and antifriction coating 370 combination, according to the present invention, results in wear to the vane assembly of less than about 0.005 inches over 2 million reciprocations (i.e., cycles) at temperatures up to about 800° F., where each cycle or reciprocation comprises one movement in the reciprocating back and forth motion.

The variable stator vane assembly of the present invention having the wear coating 360 and antifriction coating 370 combination preferably maintains a friction coefficient between the sliding surfaces at or below about 0.6 over the entire operating range of vane 350. More preferably, the variable stator vane assembly of the present invention maintains a friction coefficient between the sliding surfaces of below about 0.5 over the entire operating range of vane 350. In particular, the antifriction coating 370 of the present invention preferably maintains a coefficient of friction of less than about 0.5 when in contact with the surface of the wear coating or the surface of the bushing system in a reciprocating motion under a load at temperatures up to 800° F. (427° C.).

In another embodiment of the present invention, additives may be included in the antifriction coating 370 to provide additional desirable properties for the coating. The additional additive is an additive that provides desirable properties, such as increased lubricity, increased adhesion, or increased coating uniformity to the composition. Suitable additional additives include, but are not limited to, polytetrafluoroethylene, adhesion promoters, dispersing agents and combinations thereof. Examples of additional additives include graphite, molybdenum sulfide, molybdenum diselenide and copper.

The variable stator vane bushing and seal materials set forth in the best mode of practicing the present invention more than double the wear life in the engine systems in which they are used. The combination of the wear coating 360 and antifriction coating 370 of the present invention assure reduced coefficients of friction, in the range of about 0.2 to about 0.6, over the life of the system. This is significant, as some conventional gas turbine engine systems have been designed to accommodate coefficients of friction as high as about 0.95, which occur as bushing and wear materials deteriorate during normal engine operation. Improvements in coefficient of friction permit the reduction in size, and hence weight of the actuation mechanism of the variable guide vanes, including the lever arms. Although the above embodiments have been described with respect to a variable stator vane bushing arrangement, the coating system of the present invention may be used with any sliding surfaces that require lubrication. The coating system of the present invention is particularly useful for sliding application that are exposed to higher temperatures, including temperatures from about 400° F. (204° C.) up to about 1200° F. (649° C.) and atmospheres substantially devoid of water vapor. The antifriction coating 370 preferably maintains a coefficient of friction between the opposed surfaces of less than about 0.95 at temperatures greater than about 400° F. and/or devoid of water vapor for at least 500,000 reciprocations.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A variable stator vane assembly for use in a compressor section of a turbine engine, comprising:
   a plurality of movable metallic stator vanes;
   a metallic stator casing supporting the vanes;
   a bushing system positioned between the stator vanes and the stator casings, the bushing system comprising a bushing, the bushing comprising a material selected from the group consisting of metal, ceramic or combinations thereof; and
   a wear coating disposed on a surface of the vanes in contact with the bushing system, the wear coating comprising titanium nitride.

2. The stator vane assembly of claim 1, wherein the titanium nitride comprises a material selected from the group consisting of TiN, TiAlCrN, TiAlN and combinations thereof.

3. The stator vane assembly of claim 2, wherein the titanium nitride comprises a material selected from the group consisting of TiAlCrN.

4. The stator vane assembly of claim 1, wherein each vane further includes the wear coating on a surface of an airfoil of the vanes.

5. The stator assembly of claim 1, wherein the wear coating is applied to a thickness of from about 0.0002 to about 0.010 inches.

6. The stator assembly of claim 1, wherein the vane having the wear coating disposed thereon has a fatigue strength greater than or equal to 90% of the fatigue strength of an uncoated vane.

7. The stator assembly of claim 6, wherein the vane having the wear coating disposed thereon has a fatigue strength greater than or equal to 95% of the fatigue strength of an uncoated vane.

8. The stator assembly of claim 1 further including an antifriction coating applied along the interface between the coated vane and the bushing assembly.

9. A variable stator vane assembly for use in a compressor section of a turbine engine, comprising:
   a plurality of movable metallic stator vanes, the vane comprising a wear resistant coating;
   a metallic stator casing supporting the vanes;
   a bushing system positioned between the stator vanes and the stator casings, the bushing system comprising a bushing, the bushing comprising a material selected from the group consisting of metal, ceramic or combinations thereof;
   a wear coating disposed on a surface of the vanes in contact with the bushing system, the wear coating comprising titanium nitride; and
   an antifriction coating is disposed on one or more of the vane and the bushing systems.

10. The stator vane assembly of claim 9, wherein the titanium nitride comprises a material selected from the group consisting of TiN, TiAlCrN, TiAlN and combinations thereof.

11. The stator vane assembly of claim 10, wherein the titanium nitride comprises a material selected from the group consisting of TiAlCrN.

12. The stator vane assembly of claim 9, wherein each vane further includes the wear coating on a surface of an airfoil of the vanes.

13. The stator assembly of claim 9, wherein the wear coating is applied to a thickness of from about 0.0002 to about 0.010 inches.

14. The stator assembly of claim 9, wherein the vane having the wear coating disposed thereon has a fatigue strength greater than or equal to 90% of the fatigue strength of an uncoated vane.

15. The stator assembly of claim 14, wherein the vane having the wear coating disposed thereon has a fatigue strength greater than or equal to 95% of the fatigue strength of an uncoated vane.

16. The stator assembly of claim 9, further including an antifriction coating applied on a surface of one or both of the vane and the bushing system.

17. The stator assembly of claim 16, wherein the antifriction coating is a titanium oxide binder that further includes a friction modifying agent uniformly dispersed through the coating.

18. The stator assembly of claim 17, wherein the friction modifying agent comprises tungsten disulfide.

19. A method for coating a bushing of a variable stator vane assembly comprising:
   providing a stator vane having a trunnion portion and an airfoil portion; and
   applying a wear coating comprising titanium nitride on a surface of the vane to provide a coated trunnion portion and an airfoil portion having an increased resistance to wear and erosion.

20. The method of claim 19, wherein the titanium nitride comprises a material selected from the group consisting of TiN, TiAlCrN, TiAlN and combinations thereof.

21. The method of claim 20, wherein the titanium nitride comprises a material selected from the group consisting of TiAlCrN.

22. The method of claim 19, wherein the wear coating is applied to a thickness of from about 0.0002 to about 0.010 inches.

23. The method of claim 19, wherein the vane having the wear coating disposed thereon has a fatigue strength greater than or equal to 90% of the fatigue strength of an uncoated vane.

24. The method of claim 23, wherein the vane having the wear coating disposed thereon has a fatigue strength greater than or equal to 95% of the fatigue strength of an uncoated vane.

* * * * *